United States Patent
Li

(10) Patent No.: US 8,552,294 B2
(45) Date of Patent: Oct. 8, 2013

(54) CABLE MANAGEMENT APPARATUS

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 85 days.

(21) Appl. No.: 13/338,517

(22) Filed: Dec. 28, 2011

(65) Prior Publication Data
US 2012/0228002 A1 Sep. 13, 2012

(30) Foreign Application Priority Data
Mar. 9, 2011 (CN) .......................... 2011 1 0055869

(51) Int. Cl.
*H02G 3/04* (2006.01)

(52) U.S. Cl.
USPC ......... 174/68.1; 174/72 A; 174/135; 385/134; 385/135; 248/68.1

(58) Field of Classification Search
USPC ............. 174/68.1, 72 A, 135, 88 R, 72 R, 95, 174/40 CC, 480; 248/68.1, 74.1, 74.2, 74.3, 248/74.4; 385/134, 135
See application file for complete search history.

(56) References Cited

U.S. PATENT DOCUMENTS

| | | | | |
|---|---|---|---|---|
| 6,546,179 B2 * | 4/2003 | Petri | ............................. | 385/134 |
| 6,953,895 B2 * | 10/2005 | L'Henaff et al. | ............. | 385/135 |
| 7,565,051 B2 * | 7/2009 | Vongseng | ..................... | 385/135 |
| 7,764,857 B2 * | 7/2010 | Sjodin | ........................... | 385/135 |
| 7,825,337 B2 * | 11/2010 | Young, IV | ................... | 174/72 A |

* cited by examiner

*Primary Examiner* — Angel R Estrada
(74) *Attorney, Agent, or Firm* — Altis & Wispro Law Group, Inc.

(57) ABSTRACT

A cable management apparatus includes a securing board and a cable management element. The securing board includes a board body and two positioning portions. Each positioning portion includes a neck portion and a head portion. A diameter of the neck portion is less than that of the head portion. The cable management element to hold cables captive includes a base panel, a first connecting panel, a first securing portion, a second connecting panel, and a second securing portion. The sides of the cable management element are squeezed together for attachment to and for disengagement from the board body.

13 Claims, 3 Drawing Sheets ated to bring the positioning portion 111 out of the first part 341, and thereby the cable management element 30 can be easily removed from the securing board 10, and the cable(s) 20 will drop free with no extraction required.

CABLE MANAGEMENT APPARATUS

BACKGROUND

1. Technical Field

The present disclosure relates to cable management apparatuses, and more particularly to a cable management apparatus used in an electronic device.

2. Description of Related Art

Many electronic devices, such as computers, have multiple cables. The cables may include for example, power cables, data cables, communication lines, or keyboard lines. Therefore it is desirable to include some type of cable management apparatus, such as a binding accessory that allows the various cables to be collected together and attached in a position to improve the use of space and facilitate a visual examination inside an electronic device. However, the binding accessories of related art are not suited for temporary use in securing cables, and cause inconvenience and a waste of time if replacement or re-routing of the cables is required.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
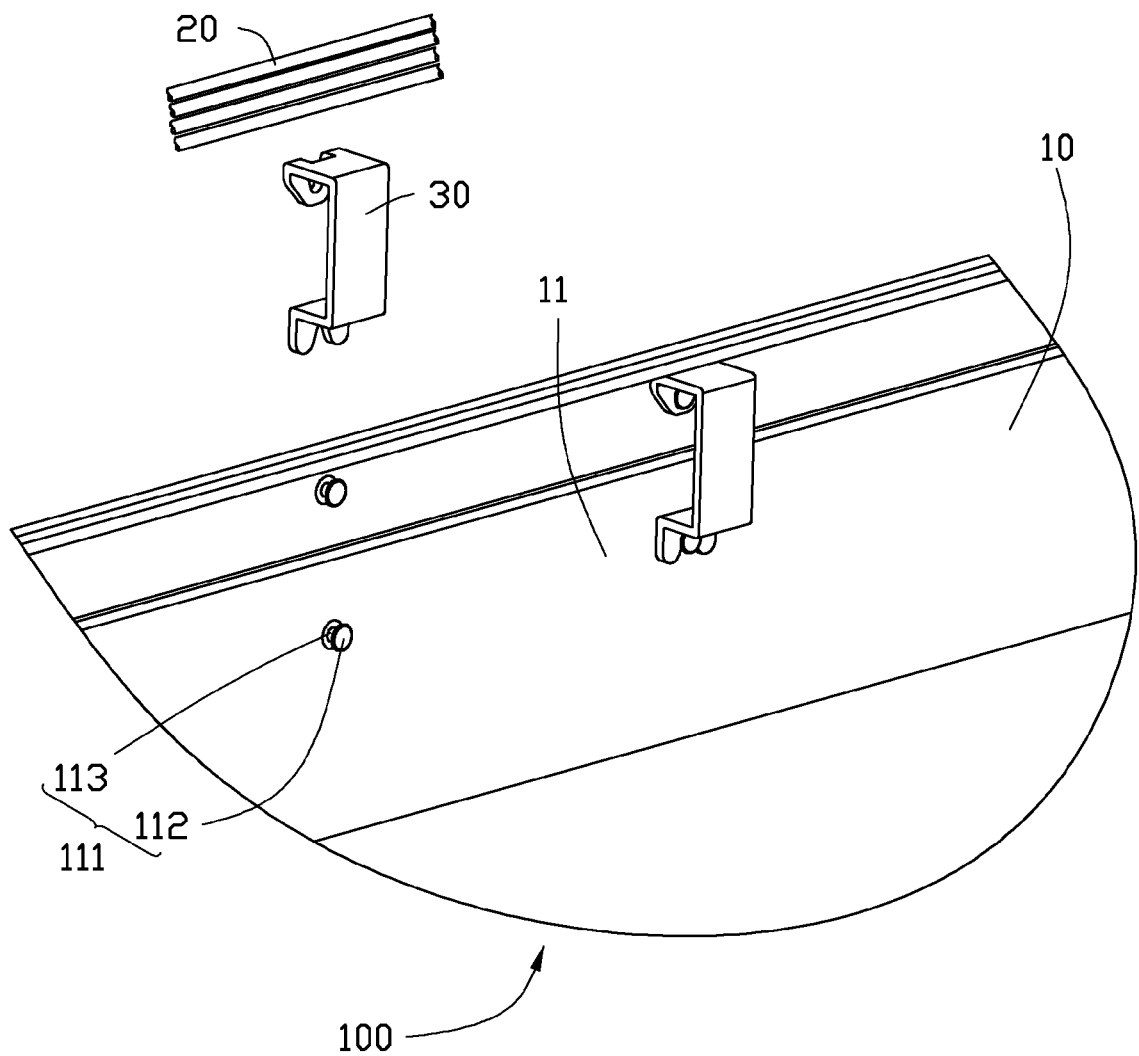
FIG. 1 is an isometric, exploded view of an embodiment of a cable management apparatus.

Referring to FIG. 1, a cable management apparatus in accordance with an embodiment includes a securing board 10 and two cable management elements 30 mounted to the securing board 10. In one embodiment, the securing board 10 may be a side plate of an electronic device enclosure (enclosure 100), and the cable management elements 30 receives one or more cables 20.

The enclosure 100 includes a bottom plate (not labeled), and the securing board 10 is connected to the bottom plate. The securing board 10 has a board body 11 and two or more pairs of positioning portions 111. Each positioning portion 111 of a pair includes a neck portion 113, extending from the board body 11, and a head portion 112, extending from the neck portion 113. The diameter of the neck portion 113 is substantially less than the diameter of the head portion 112.

Figure 2:
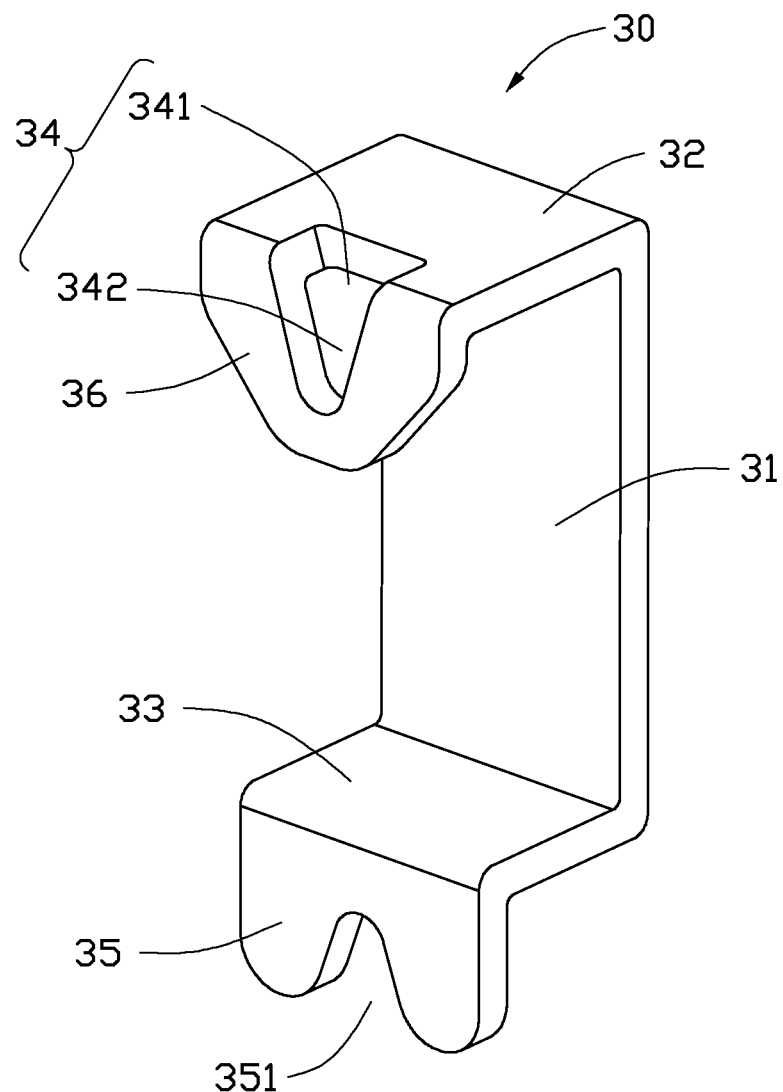
FIG. 2 is an isometric view of a cable management element of FIG. 1.

Referring to FIG. 2, each cable management element 30 includes a base panel 31, a first connecting panel 32 extending from the base panel 31, a first securing portion 36 extending from the first connecting panel 32, a second connecting panel 33 extending from the base panel 31, and a second securing portion 35 extending from the second connecting panel 33. The first connecting panel 32 is substantially parallel to the second connecting panel 33 and substantially perpendicular to the base panel 31. The first securing portion 36 is substantially perpendicular to the first connecting panel 32. The second securing portion 35 is substantially perpendicular to the second connecting panel 33. A first mounting opening 34 is defined in the connection portion between the first connecting panel 32 and the first securing portion 36. The first mounting opening 34 includes a first part 341 defined in the first connecting panel 32 and a second part 342 defined in the first securing portion 36 communicating with the first part 341. The first part 341 is rectangular in a first aspect, developing into the second part 342 which is V-shaped in a second aspect. A second mounting opening 351 is defined in the second securing portion 35. The second mounting opening 351 is also V-shaped in the second aspect, but opposes the shape defined in the second part 342.

Figure 3:
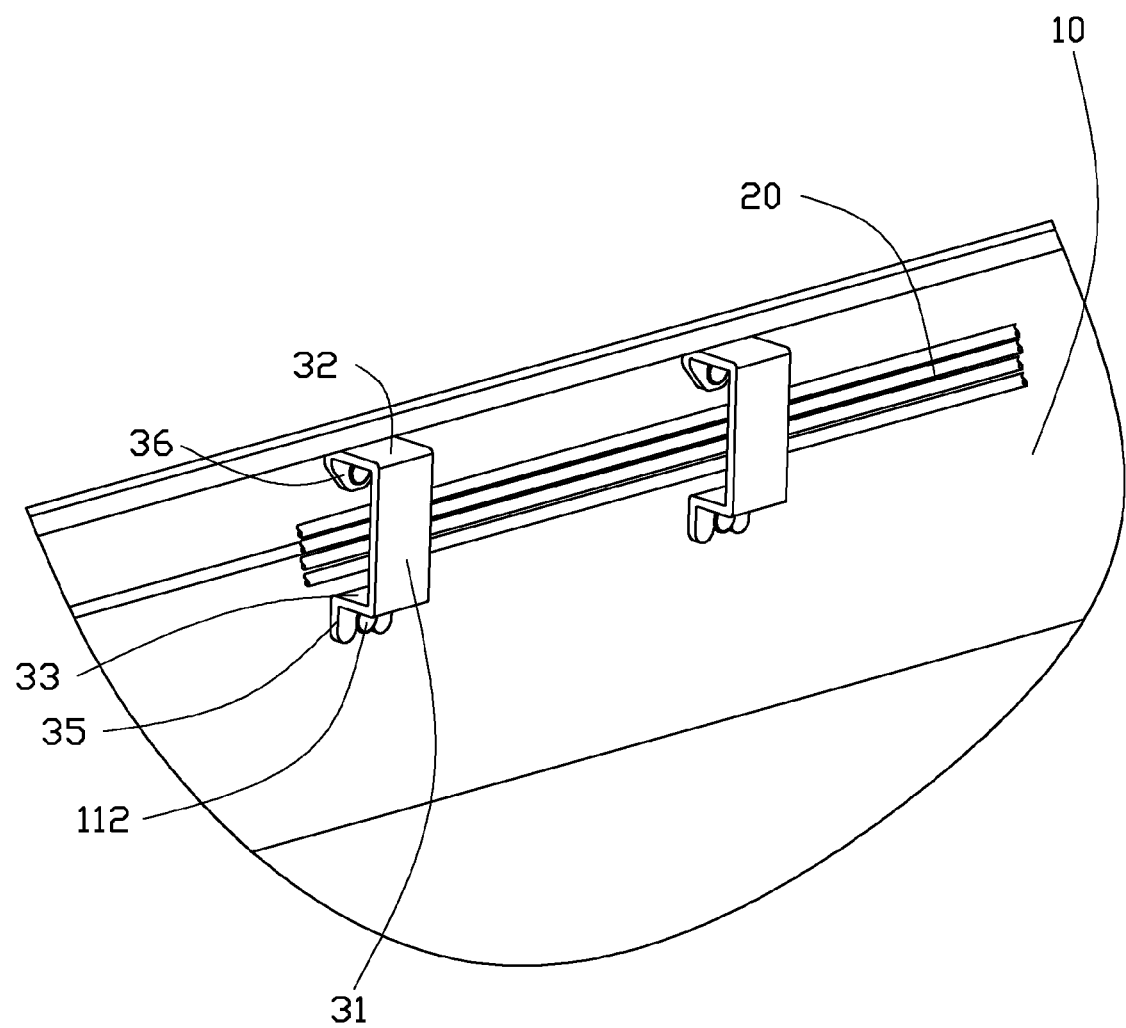
FIG. 3 is an assembled view of FIG. 1.

Referring to FIGS. 1 to 3, in assembly, the cable 20, or all the cables 20, is placed between each pair of the positioning portions 111. Each cable management element 30 is manipulated to enable the head portion 112 of the positioning portion 111 to pass through the first part 341 of the first mounting opening 34. The cable management element 30 is lifted further to enable the head portion 112 to be received in the second part 342 of the first mounting opening 34. At this time, the neck portion 113 binds in the second part 342. The second connecting panel 33 may be deformed by finger pressure towards the first connecting panel 32 to enable the second mounting opening 351 to engage the neck portion 113 of the positioning portion 111. The release of the second connecting panel 33 allows at least partial relief from deformation as the second mounting opening 351 moves onto and around the neck portion 113. The first securing portion 36 and the second securing portion 35 are disposed between the board body 11 and the head portions 112. The first securing portion 36 and the second securing portion 35 are substantially prevented from moving in any direction, and, within reasonable limits, the greater the number of cables 20 included in the cable management element 30 the greater the pressure, accidental or otherwise, which is required to dislodge each cable management element 30.

When the cable 20 needs to be removed from the cable management elements 30, the second connecting panel 33 and the first connecting panel 32 are squeezed together to release the second mounting opening 351 from the neck portion 113. The cable management element 30 may be manipulated to bring the positioning portion 111 out of the first part 341, and thereby the cable management element 30 can be easily removed from the securing board 10, and the cable(s) 20 will drop free with no extraction required.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the invention to the full extent indicated by the broad general meaning of the terms in which the appended claims are expressed.

What is claimed is:

1. A cable management apparatus, comprising:
  a securing board, the securing board comprising a board body and two positioning portions extending from the board body; each positioning portion comprising a neck portion extending from the board body and a head portion extending from the neck portion, a cross section of the neck portion being less than a cross section of the head portion taken along a plane parallel to the board body; and the two neck portions comprising a first neck portion and a second neck portion; and a cable management element, the cable management element comprising:
- a base panel;
- a first connecting panel extending from the base panel;
- a first securing portion extending from the first connecting panel; the first securing portion substantially parallel to the board body; the first securing portion and the base panel being in the same side of the first connecting panel; and a first mounting opening defined in the first securing portion for receiving the first neck portion to prevent the cable management element from moving along a first direction substantially parallel to the board body;
- a second connecting panel extending from the base panel; and
- a second securing portion extending from the second connecting panel; the second securing portion is substantially parallel to the board body; a second mounting opening defined in the second securing portion for receiving the second neck portion to prevent the cable management element from moving along a second direction substantially opposite to the first direction.

2. The cable management apparatus of claim 1, wherein the first mounting opening defines a first part defined in the first connecting panel and a second part communicated with the first part, and the second part is defined in the first securing portion.

3. The cable management apparatus of claim 2, wherein the second part is V-shaped.

4. The cable management apparatus of claim 1, wherein the second mounting opening is V-shaped.

5. The cable management apparatus of claim 1, wherein the base panel is substantially parallel to the board body.

6. The cable management apparatus of claim 1, wherein the first connecting panel is substantially perpendicular to the base panel.

7. The cable management apparatus of claim 1, wherein the second connecting panel is substantially perpendicular to the base panel.

8. A cable management apparatus, comprising:
- a securing board, the securing board comprising a board body and two positioning portions extending from the board body; each positioning portion comprising a neck portion extending from the board body and a head portion extending from the neck portion, a cross section of the neck portion being less than a cross section of the head portion taken along a plane parallel to the board body; and
- a cable management element, the cable management element comprising:
  - a first securing portion, a first mounting opening defined in the first securing portion; and
  - a second securing portion; a second mounting opening defined in the second securing portion;
- wherein the two neck portions of the two positioning portions are received in the first mounting opening and the second mounting opening to prevent the cable management element from moving along a first direction substantially parallel to the board body; the first securing portion and the second securing portion are disposed between the board body and the two head portions of the two positioning portions to be prevented from moving in a second direction substantially perpendicular to the board body; and the cable management element further comprises a base panel and a first connecting panel; the first securing portion is connected to the first connecting panel; the first mounting opening has a first part defined in the first connecting panel and a second part communicated with the first part, the second part defined in the first securing portion.

9. The cable management apparatus of claim 8, wherein the second part is V-shaped.

10. The cable management apparatus of claim 8, wherein the second mounting opening is V-shaped.

11. The cable management apparatus of claim 8, wherein the cable management element further comprises a first connecting panel extending from the first securing portion, a second connecting panel extending from the second securing portion, and base panel connected between the first connecting panel and the second connecting panel; and the base panel is substantially parallel to the board body.

12. The cable management apparatus of claim 11, wherein the first connecting panel is substantially perpendicular to the base panel.

13. The cable management apparatus of claim 11, wherein the second connecting panel is substantially perpendicular to the base panel.

* * * * *